United States Patent
Umeda et al.

(10) Patent No.: US 11,221,072 B2
(45) Date of Patent: Jan. 11, 2022

(54) ARRANGEMENT STRUCTURE FOR SEAL MEMBER

(71) Applicant: VALQUA, LTD., Tokyo (JP)

(72) Inventors: Katsuhisa Umeda, Gojo (JP); Akira Ueda, Gojo (JP); Mitsuru Minami, Gojo (JP); Akihiro Nagano, Gojo (JP)

(73) Assignee: VALQUA, LTD., Tokyo (JP)

(*) Notice: Subject to any disclaimer, the term of this patent is extended or adjusted under 35 U.S.C. 154(b) by 183 days.

(21) Appl. No.: 16/491,315

(22) PCT Filed: Mar. 7, 2018

(86) PCT No.: PCT/JP2018/008747
§ 371 (c)(1),
(2) Date: Sep. 5, 2019

(87) PCT Pub. No.: WO2018/180307
PCT Pub. Date: Oct. 4, 2018

(65) Prior Publication Data
US 2020/0072354 A1 Mar. 5, 2020

(30) Foreign Application Priority Data
Mar. 31, 2017 (JP) .............................. JP2017-069487

(51) Int. Cl.
*F16J 15/18* (2006.01)
*F16J 15/3232* (2016.01)
(Continued)

(52) U.S. Cl.
CPC ........... *F16J 15/18* (2013.01); *F16J 15/3232* (2013.01); *F16J 15/022* (2013.01); *F16J 15/104* (2013.01); *F16J 15/3268* (2013.01); *F16J 15/48* (2013.01)

(58) Field of Classification Search
CPC .... F16J 15/00; F16J 15/16; F16J 15/50; F16J 15/52; F16J 15/187; F16J 15/32;
(Continued)

(56) References Cited

U.S. PATENT DOCUMENTS 3,052,478 A * 9/1962 Horvereid ................ F16J 15/32
277/394
3,144,256 A * 8/1964 Wright ................. F16J 15/3232
277/436
(Continued)

FOREIGN PATENT DOCUMENTS

CN 104838186 A 8/2015
JP H02-018971 U 2/1990
(Continued)

OTHER PUBLICATIONS

International Search Report dated May 29, 2018, which issued in corresponding PCT Patent Application No. PCT/JP2018/008747, incl. Eng. translation.
(Continued)

*Primary Examiner* — Nathan Cumar
(74) *Attorney, Agent, or Firm* — Dickinson Wright PLLC (57) ABSTRACT

An arrangement structure for a seal member includes: a first member having a first mating surface and provided with a groove portion; a second member having a second mating surface, and configured to move relatively to the first member; and an annular seal member fitted into the groove portion, providing sealing between the first member and the second member, and serving as a partition between an atmosphere-side space and a pressurized-side space. The seal member includes a plurality of first protruding portions protruding toward the second mating surface and aligned from the atmosphere-side space toward the pressurized-side space. The seal member has such a shape that, in a state of not being fitted into the groove portion, a protrusion height
(Continued)

of the first protruding portion increases in stages from the first protruding portion arranged close to the pressurized-side space toward the first protruding portion arranged close to the atmosphere-side space.

6 Claims, 7 Drawing Sheets

(51) Int. Cl.
*F16J 15/02* (2006.01)
*F16J 15/10* (2006.01)
*F16J 15/3268* (2016.01)
*F16J 15/48* (2006.01)

(58) Field of Classification Search
CPC .. F16J 15/3204; F16J 15/3232; F16J 15/3236; F16J 15/3268; F16J 15/3272; F16J 15/02; F16J 15/021; F16J 15/08; F16J 15/022; F16J 15/10; F16J 15/104; F16J 15/106; F16J 15/108; F16J 15/48
USPC ........................................................ 277/559
See application file for complete search history.

(56) References Cited

U.S. PATENT DOCUMENTS

| | | | | |
|---|---|---|---|---|
| 3,215,441 A | * | 11/1965 | Horvereid | F16J 15/32 |
| | | | | 277/437 |
| 5,895,053 A | * | 4/1999 | Bauman | F16F 9/0218 |
| | | | | 277/566 |
| 2015/0345639 A1 | * | 12/2015 | Suzuki | F16J 15/006 |
| | | | | 277/563 |

FOREIGN PATENT DOCUMENTS

| | | |
|---|---|---|
| JP | 2008-275089 A | 11/2008 |
| JP | 2010-190300 A | 9/2010 |
| JP | 2010-242874 A | 10/2010 |
| JP | 2013-050133 A | 3/2013 |
| JP | 2013-185702 A | 9/2013 |

OTHER PUBLICATIONS

Chinese Office Action dated May 12, 2020, which issued in the corresponding Chinese Patent Application No. 201880022045.5, including English translation.

\* cited by examiner

ARRANGEMENT STRUCTURE FOR SEAL MEMBER

TECHNICAL FIELD

The present invention relates to an arrangement structure for a seal member.

BACKGROUND ART

As to a conventional arrangement structure for a seal member, Japanese Patent Laying-Open No. 2010-242874, for example, discloses a sealing apparatus for reciprocating motion, which is aimed at achieving both reduction in sliding resistance and securing of sealability by followability in a radial direction (PTL 1).

The sealing apparatus for reciprocating motion disclosed in PTL 1 includes: a housing provided with a holding groove; a reciprocating component arranged on an inner circumference of the housing so as to be capable of reciprocating in an axial direction; a sliding ring arranged in the holding groove, slidably and closely contacting an outer circumferential surface of the reciprocating component, and made of a fluororesin material; and a packing arranged on the outer circumferential side of the sliding ring and made of a rubber-like elastic material. The sliding ring has: a main body portion biased in a radial direction by the packing; a seal lip extending from axial one end of the main body portion and slidably and closely contacting the outer circumferential surface of the reciprocating component; and a collar portion extending to a position on the opposite sealed space side of the packing in the holding groove.

Japanese Patent Laying-Open No. 2010-190300 discloses a rotary shaft seal, which is aimed at being excellently assembled into a recessed groove and being suitable for an air pressure application (PTL 2).

The rotary shaft seal disclosed in PTL 2 is formed by integrally bonding a rubber portion and a thin resin portion that is in sliding contact with a rotary shaft. The thin resin portion is provided with a plurality of small recessed grooves.

Japanese Patent Laying-Open No. 2013-50133 discloses a sealing apparatus, which is aimed at effectively increasing durability with respect to sliding and maintaining initial sealability for a long period of time (PTL 3).

The sealing apparatus disclosed in PTL 3 is made of a rubber-like elastic material. The sealing apparatus has a sliding surface that is dense relative to the interior of the sealing apparatus, is surface-treated to be hard, and is roughened.

CITATION LIST

Patent Literature

PTL 1: Japanese Patent Laying-Open No. 2010-242874
PTL 2: Japanese Patent Laying-Open No. 2010-190300
PTL 3: Japanese Patent Laying-Open No. 2013-50133

SUMMARY OF INVENTION

Technical Problem

As disclosed in PTLs 1 to 3 above, various types of seal members have been proposed as means for providing sealing between the relatively reciprocating members or between the rotating members. In such seal members, a low sliding resistance of the seal members is desired in order to prevent occurrence of stick slip. However, simply reducing the strained force of the seal members as a method for reducing the sliding resistance of the seal members causes reduction in sealing performance of the seal members.

Accordingly, an object of the present invention is to solve the above-described problem and to provide an arrangement structure for a seal member that achieves excellent sliding performance and sealing performance.

Solution to Problem

An arrangement structure for a seal member according to the present invention includes: a first member having a first mating surface and provided with a groove portion, the groove portion being recessed from the first mating surface and extending annularly; a second member having a second mating surface facing the first mating surface, and configured to move relatively to the first member; and an annular seal member fitted into the groove portion, providing sealing between the first member and the second member, and serving as a partition between a first space and a second space having a pressure higher than that of the first space. The seal member includes a plurality of first protruding portions protruding toward the second mating surface and aligned from the first space toward the second space. The seal member has such a shape that, in a state of not being fitted into the groove portion, a protrusion height of the first protruding portion increases in stages from the first protruding portion arranged close to the second space toward the first protruding portion arranged close to the first space.

Advantageous Effects of Invention

According to the present invention, there can be provided an arrangement structure for a seal member that achieves excellent sliding performance and sealing performance.

DESCRIPTION OF EMBODIMENTS

Embodiments of the present invention will be described with reference to the drawings, in which the same or corresponding members are denoted by the same reference numerals.

First Embodiment

Figure 1:
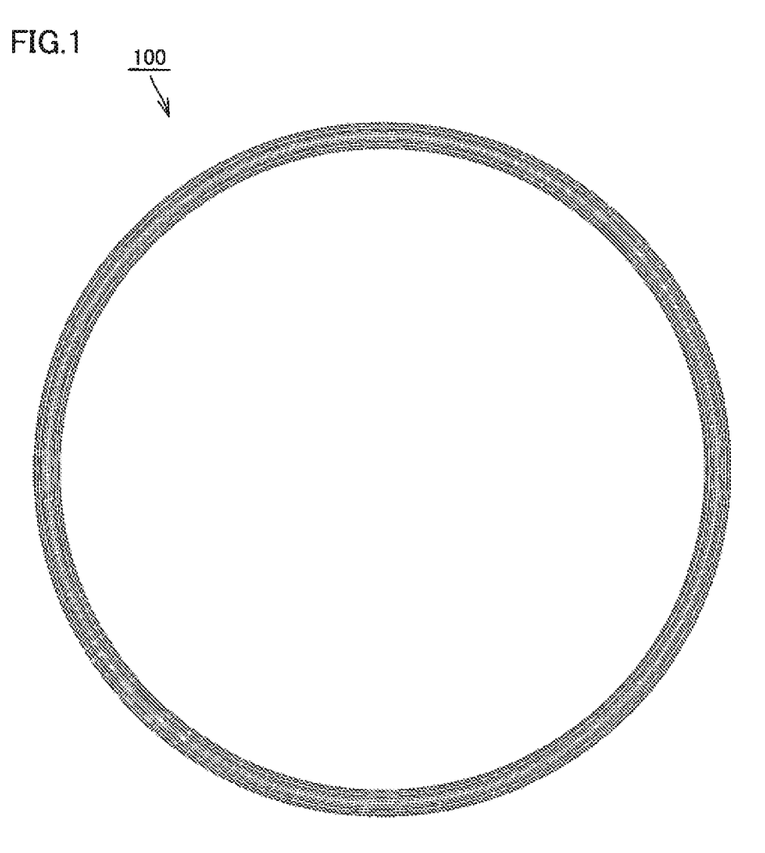
FIG. 1 is a plan view showing a seal member.
Figure 2:
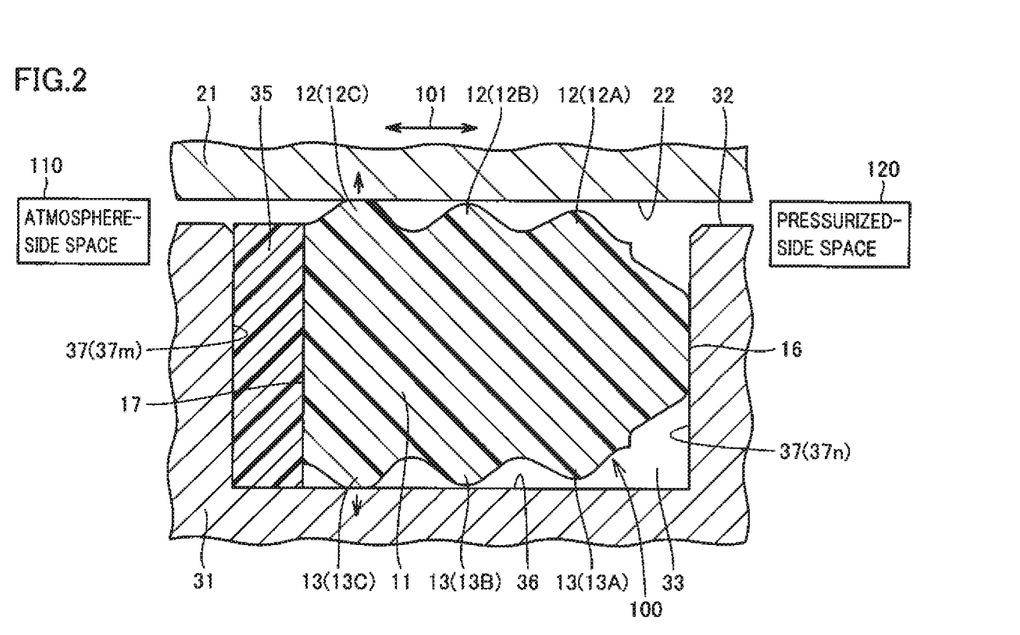
FIG. 2 is a cross-sectional view showing an arrangement structure (initial state) for the seal member in a first embodiment of the present invention.
Figure 3:
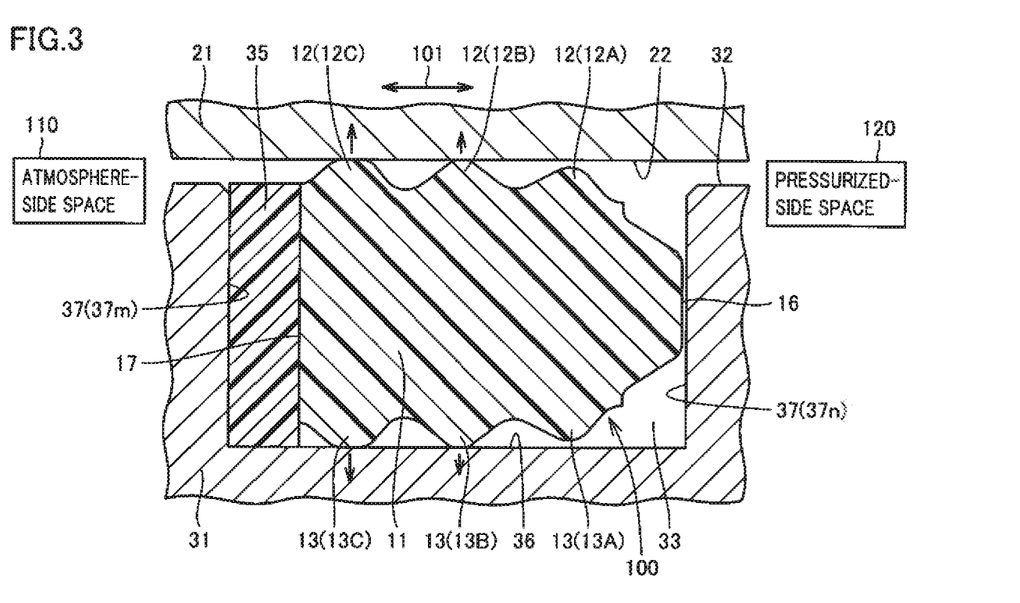
FIG. 3 is a cross-sectional view showing an arrangement structure (medium pressure state) for the seal member in the first embodiment of the present invention.
Figure 4:
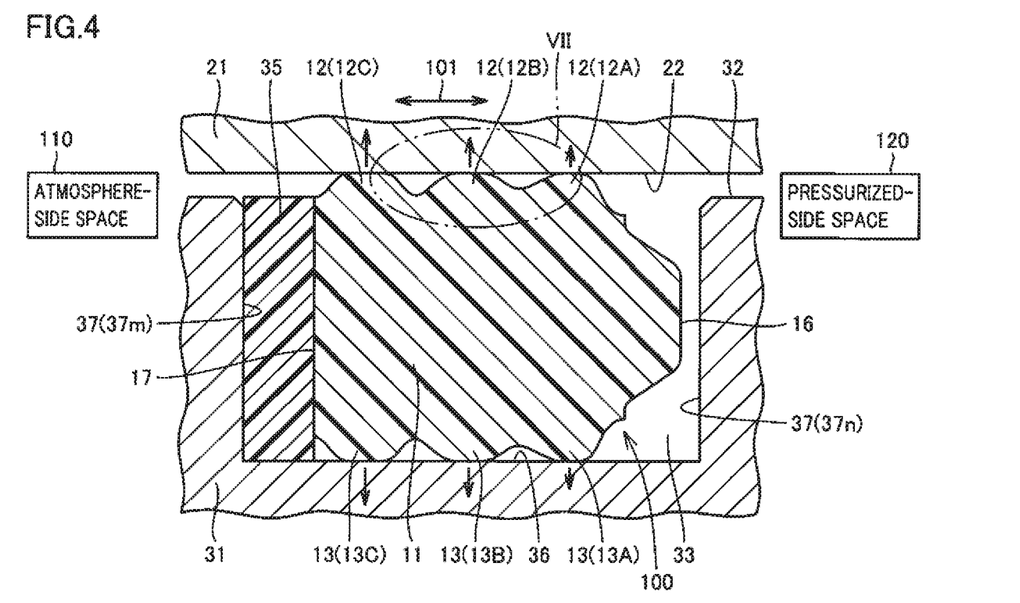
FIG. 4 is a cross-sectional view showing an arrangement structure (high pressure state) for the seal member in the first embodiment of the present invention.
Figure 5:
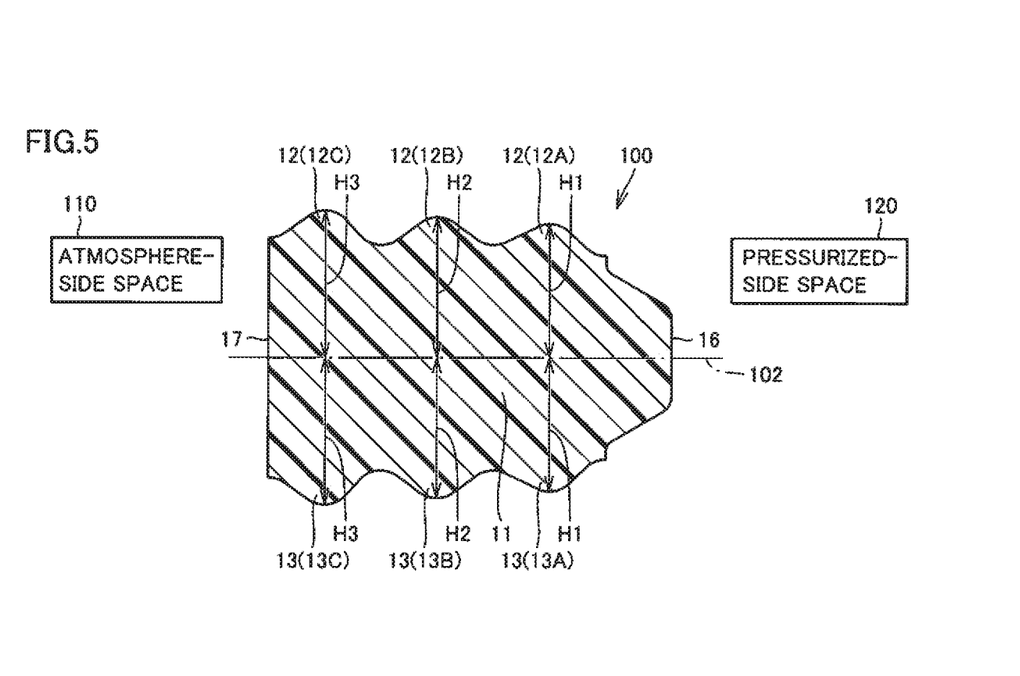
FIG. 5 is a cross-sectional view showing a state (non-fitted state) in which the seal member shown in FIGS. 2 to 4 is not fitted into a groove portion.

FIG. 1 is a plan view showing a seal member FIGS. 2 to 4 are cross-sectional views showing an arrangement structure for the seal member in a first embodiment of the present invention. FIG. 5 is a cross-sectional view showing a state (non-fitted state) in which the seal member shown in FIGS. 2 to 4 is not fitted into a groove portion.

Each of FIGS. 2 to 5 shows a cross section of the arrangement structure (seal member) for the seal member when cut along a plane orthogonal to a tangent direction of the annular seal member. The seal member basically has the same cross-sectional shape at any positions in a circumferential direction of the seal member.

Referring to FIGS. 1 to 5, the arrangement structure for the seal member in the present embodiment has a seal member 100, a first member 31 and a second member 21.

Seal member 100 is an annular seal member and is used to provide sealing between first member 31 and second member 21. Seal member 100 is made of a single material. Seal member 100 is made of an elastically deformable material such as rubber. Examples of the rubber material used in seal member 100 include fluororubber, silicon rubber, NBR, HNBR, EPDM-based rubber and the like, each of which have a hardness of approximately 60 to 90 HA.

Second member 21 moves relatively to first member 31. In the present embodiment, first member 31 is a housing having a cylindrical shape, and second member 21 is a shaft having a columnar shape and inserted into first member 31. Second member 21 reciprocates along a direction shown by an arrow 101 in FIGS. 2 to 4.

A material forming first member 31 and second member 21 is not particularly limited. As one example, first member 31 and second member 21 are made of metal.

First member 31 has a first mating surface 32. First mating surface 32 is an inner circumferential surface of first member 31 having a cylindrical shape. Second member 21 has a second mating surface 22. Second mating surface 22 is an outer circumferential surface of second member 21 having a columnar shape. First member 31 and second member 21 are arranged such that first mating surface 32 and second mating surface 22 face each other. First mating surface 32 and second mating surface 22 face each other in a radial direction of first member 31 and second member 21.

First member 31 is provided with a groove portion 33. Seal member 100 is fitted into groove portion 33. Groove portion 33 is recessed from first mating surface 32 and extends annularly. Groove portion 33 is open in first mating surface 32 and extends along a circumferential direction of first member 31. Groove portion 33 has a rectangular groove cross section.

First member 31 has a groove bottom surface 36 and a pair of groove side surfaces 37 (37m and 37n). Groove portion 33 is formed by groove bottom surface 36 and the pair of groove side surfaces 37. Groove bottom surface 36 faces second mating surface 22 and forms a bottom wall of groove portion 33. Groove bottom surface 36 is arranged in parallel with second mating surface 22. Groove bottom surface 36 is arranged in parallel with first mating surface 32. The pair of groove side surfaces 37 rise from groove bottom surface 36 toward first mating surface 32 and form side walls of groove portion 33. The pair of groove side surfaces 37 rise from groove bottom surface 36 at a right angle. Groove side surface 37m and groove side surface 37n face each other in an axial direction of first member 31.

Seal member 100 serves as a partition between an atmosphere-side space 110 and a pressurized-side space 120. Atmosphere-side space 110 and pressurized-side space 120 are spaced apart from each other in the axial direction of first member 31 and second member 21. Seal member 100 is arranged between atmosphere-side space 110 and pressurized-side space 120 in the axial direction of first member 31 and second member 21.

Atmosphere-side space 110 is a space released to the atmosphere. Pressurized-side space 120 has a pressure higher than that of atmosphere-side space 110. Pressurized-side space 120 is a hydraulic pressure space in which oil is arranged. Pressurized-side space 120 is not limited to the hydraulic pressure space and may, for example, be an air pressure space in which the air is arranged.

Seal member 100 has, as its constituent components, a base portion 11, a plurality of first protruding portions 12 (12A, 12B and 12C), and a plurality of second protruding portions 13 (13A, 13B and 13C).

Base portion 11 forms a main portion of seal member 100. Base portion 11 is provided at a position spaced from second mating surface 22 and groove bottom surface 36. Base portion 11 is provided at the position spaced outwardly in the radial direction of first member 31 and second member 21 from second mating surface 22 and spaced inwardly in the radial direction of first member 31 and second member 21 from groove bottom surface 36.

First protruding portion 12 protrudes toward second mating surface 22. First protruding portion 12 has a convex shape protruding from base portion 11 toward second mating surface 22. The plurality of first protruding portions 12 are aligned from atmosphere-side space 110 toward pressurized-side space 120. The plurality of first protruding portions 12 are aligned in the axial direction of first member 31 and second member 21.

In the direction of alignment of the plurality of first protruding portions 12, first protruding portion 12A is located closest to pressurized-side space 120, of the plurality of first protruding portions 12, and first protruding portion 12C is located closest to atmosphere-side space 110, of the plurality of first protruding portions 12. In the direction of alignment of the plurality of first protruding portions 12, first protruding portion 12B is located between first protruding portion 12A and first protruding portion 12C.

In the non-fitted state shown in FIG. 5, seal member 100 has such a shape that a protrusion height of first protruding portion 12 increases in stages from first protruding portion 12 arranged close to pressurized-side space 120 toward first protruding portion 12 arranged close to atmosphere-side space 110.

In FIG. 5, a center line 102 of seal member 100 in a depth direction of groove portion 33 is shown. When center line 102 is used as a reference, first protruding portion 12A located closest to pressurized-side space 120, of the plurality of first protruding portions 12, has a height H1. First protruding portion 12B located adjacently to first protruding portion 12A has a height H2 higher than height H1 (H2>H2). First protruding portion 12C located closest to atmosphere-side space 110, of the plurality of first protruding portions 12, has a height H3 higher than height H2 (H3>H2).

Second protruding portion 13 protrudes toward groove bottom surface 36. Second protruding portion 13 has a convex shape protruding from base portion 11 toward groove bottom surface 36. The plurality of second protruding portions 13 are aligned from atmosphere-side space 110 toward pressurized-side space 120. The plurality of second protruding portions 13 are aligned in the axial direction of first member 31 and second member 21.

In the direction of alignment of the plurality of second protruding portions 13, second protruding portion 13A is located closest to pressurized-side space 120, of the plurality of second protruding portions 13, and second protruding portion 13C is located closest to atmosphere-side space 110, of the plurality of second protruding portions 13. In the direction of alignment of the plurality of second protruding portions 13, second protruding portion 13B is located between second protruding portion 13A and second protruding portion 13C.

In the non-fitted state shown in FIG. 5, seal member 100 has such a shape that a protrusion height of second protruding portion 13 increases in stages from second protruding portion 13 arranged close to pressurized-side space 120 toward second protruding portion 13 arranged close to atmosphere-side space 110.

When center line 102 in FIG. 5 is used as a reference, second protruding portion 13A located closest to pressurized-side space 120, of the plurality of second protruding portions 13, has height H1. Second protruding portion 13B located adjacently to second protruding portion 13A has height H2 higher than height H1 (H2>H1). Second protruding portion 13C located closest to atmosphere-side space 110, of the plurality of second protruding portions 13, has height H3 higher than height H2 (H3>H2).

The plurality of first protruding portions 12 and the plurality of second protruding portions 13 are provided symmetrically. In the cross section of seal member 100 shown in FIG. 5, the plurality of first protruding portions 12 and the plurality of second protruding portions 13 are provided to be symmetric with respect to center line 102. When the cross-sectional shape of seal member 100 shown in FIG. 5 is folded at center line 102, first protruding portion 12A and second protruding portion-13A overlap with each other, first protruding portion 12B and second protruding portion 13B overlap with each other, and first protruding portion 12C and second protruding portion 13C overlap with each other.

An angle formed by center line 102 in FIG. 5 and a straight line connecting the protruding ends of the plurality of first protruding portions 12 is preferably greater than 0° and not greater than 10°. An angle formed by center line 102 in FIG. 5 and a straight line connecting the protruding ends of the plurality of second protruding portions 13 is preferably greater than 0° and not greater than 10°. Seal member 100 preferably has a cross-sectional shape that is symmetric with respect to center line 102 in FIG. 5.

Seal member 100 has a first side surface 16 and a second side surface 17. First side surface 16 and second side surface 17 are provided on base portion 11. First side surface 16 faces groove side surface 37n on the pressurized-side space 120 side. Second side surface 17 faces groove side surface 37m on the atmosphere-side space 110 side. First side surface 16 has an area smaller than that of second side surface 17. Base portion 11 has a cross-sectional shape that tapers from first protruding portion 12A and second protruding portion 13A to first side surface 16 in the axial direction of first member 31 and second member 21. The cross-sectional shape of base portion 11 is not particularly limited.

A backup ring 35 is further fitted into groove portion 33. Backup ring 35 is arranged adjacently to seal member 100 in the axial direction of first member 31 and second member 21. Backup ring 35 is provided in contact with groove side surface 37m and second side surface 17. In the present invention, the backup ring is not an essential component.

The arrangement structure for the seal member in the present embodiment is mounted on equipment (e.g., a machine tool, a transport machine or a lift elevator) that involves hydraulic control. Depending on an operation status of the equipment, the pressure of pressurized-side space 120 changes.

FIG. 2 shows a cross-sectional shape of seal member 100 from a state in which a pressure (hydraulic pressure) is not applied from pressurized-side space 120 to seal member 100 to a state in which a low pressure is applied from pressurized-side space 120 to seal member 100 (initial state). FIG. 3 shows a cross-sectional shape of seal member 100 when a medium pressure is applied from pressurized-side space 120 to seal member 100 (medium pressure state). FIG. 4 shows a cross-sectional shape of seal member 100 when a high pressure is applied from pressurized-side space 120 to seal member 100 (high pressure state).

In the initial state shown in FIG. 2, only first protruding portion 12 arranged closest to atmosphere-side space 110, of the plurality of first protruding portions 12, comes into contact with second mating surface 22. Only second protruding portion 13 arranged closest to atmosphere-side space 110, of the plurality of second protruding portions 13, comes into contact with groove bottom surface 36.

More specifically, first protruding portion 12C arranged closest to atmosphere-side space 110, of the plurality of first protruding portions 12, comes into contact with second mating surface 22. First protruding portion 12C comes into contact with second mating surface 22, to be thereby compressed and deformed in the depth direction of groove portion 33. First protruding portion 12B and first protruding portion 12A are not in contact with second mating surface 22. A gap between first protruding portion 12B and second mating surface 22 is smaller than a gap between first protruding portion 12A and second mating surface 22.

Second protruding portion 13C arranged closest to atmosphere-side space 110, of the plurality of second protruding portions 13, comes into contact with groove bottom surface 36. Second protruding portion 13C comes into contact with groove bottom surface 36, to be thereby compressed and deformed in the depth direction of groove portion 33. Second protruding portion 13B and second protruding portion 13A are not in contact with groove bottom surface 36. A gap between second protruding portion 13B and groove bottom surface 36 is smaller than a gap between second protruding portion 13A and groove bottom surface 36.

In the medium pressure state shown in FIG. 3 and the high pressure state shown in FIG. 4, seal member 100 is deformed such that first protruding portions 12 come into contact with second mating surface 22 in order of closeness to atmosphere-side space 110, as the pressure applied from pressurized-side space 120 to seal member 100 rises. Seal member 100 is deformed such that second protruding portions 13 come into contact with groove bottom surface 36 in order of closeness to atmosphere-side space 110, as the pressure applied from pressurized-side space 120 to seal member 100 rises.

More specifically, when the pressure applied from pressurized-side space 120 to seal member 100 rises, seal member 100 is compressed and deformed in a direction from pressurized-side space 120 toward atmosphere-side space 110 (axial direction of first member 31 and second member 21). With the compression and deformation, seal member 100 is deformed to expand in the depth direction of groove portion 33.

In the medium pressure state shown in FIG. 3, in addition to first protruding portion 12C, first protruding portion 12B located adjacently to first protruding portion 12C comes into contact with second mating surface 22. First protruding portion 12C and first protruding portion 12B come into contact with second mating surface 22, to be thereby compressed and deformed in the depth direction of groove portion 33. At this time, a squeeze (amount of deformation in the depth direction of groove portion 33) of first protruding portion 12C is greater than a squeeze of first protruding portion 12C in the initial state in FIG. 2. A squeeze of first protruding portion 12B is smaller than the squeeze of first protruding portion 12C.

In addition to second protruding portion 13C, second protruding portion 13B located adjacently to second protruding portion 13C comes into contact with groove bottom surface 36. Second protruding portion 13C and second protruding portion 13B come into contact with groove bottom surface 36, to be thereby compressed and deformed in the depth direction of groove portion 33. At this time, a squeeze of second protruding portion 13C is greater than a squeeze of second protruding portion 13C in the initial state in FIG. 2. A squeeze of second protruding portion 13B is smaller than the squeeze of second protruding portion 13C.

In the high pressure state shown in FIG. 4, in addition to first protruding portion 12C and first protruding portion 12B, first protruding portion 12A located closest to pressurized-side space 120, of the plurality of first protruding portions 12, comes into contact with second mating surface 22. First protruding portion 12A, first protruding portion 12B and first protruding portion 12C come into contact with second mating surface 22, to be thereby compressed and deformed in the depth direction of groove portion 33. At this time, a squeeze of first protruding portion 12C is greater than the squeeze of first protruding portion 12C in the medium pressure state in FIG. 3, and a squeeze of first protruding portion 12B is greater than the squeeze of first protruding portion 12B in the medium pressure state in FIG. 3. A squeeze of first protruding portion 12A is smaller than the squeeze of first protruding portion 12B, and the squeeze of first protruding portion 12B is smaller than the squeeze of first protruding portion 12C.

In addition to second protruding portion 13C and second protruding portion 13B, second protruding portion 13A located closest to pressurized-side space 120, of the plurality of second protruding portions 13, comes into contact with groove bottom surface 36. Second protruding portion 13A, second protruding portion 13B and second protruding portion 13C come into contact with groove bottom surface 36, to be thereby compressed and deformed in the depth direction of groove portion 33. At this time, a squeeze of second protruding portion 13C is greater than the squeeze of second protruding portion 13C in the medium pressure state in FIG. 3, and a squeeze of second protruding portion 13B is greater than the squeeze of second protruding portion 13B in the medium pressure state in FIG. 3. A squeeze of second protruding portion 13A is smaller than the squeeze of second protruding portion 13B, and the squeeze of second protruding portion 13B is smaller than the squeeze of second protruding portion 13C.

Figure 6:
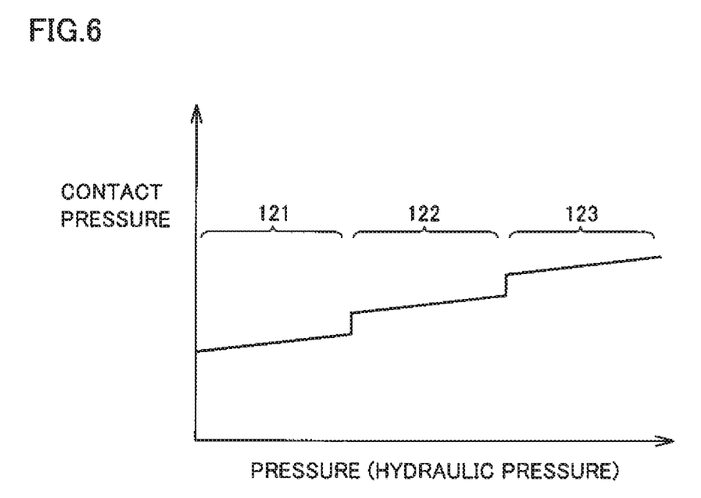
FIG. 6 is a graph showing a relationship between a pressure (hydraulic pressure) applied from a pressurized-side space to the seal member and a contact pressure between a second mating surface and the seal member.

FIG. 6 is a graph showing a relationship between a pressure (hydraulic pressure) applied from the pressurized-side space to the seal member and a contact pressure between the second mating surface and the seal member. In FIGS. 2 to 4, the magnitude of the contact pressure between second mating surface 22 and seal member 100 is expressed by a length of an arrow.

Referring to FIGS. 2 to 6, in an initial state 121, only first protruding portion 12C of the plurality of first protruding portions 12 is brought into contact with second mating surface 22, thereby reducing the contact pressure between second mating surface 22 and seal member 100 as much as possible. As a result, a sliding resistance between second member 21 and seal member 100 can be kept low and occurrence of stick slip can be effectively prevented.

Next, in a medium pressure state 122 and a high pressure state 123, the pressure applied from pressurized-side space 120 to seal member 100 rises, and thus, seal member 100 requires higher sealing performance. Accordingly, in addition to first protruding portion 12C, first protruding portion 12B and first protruding portion-12A are brought into contact with second mating surface 22 in this order, thereby increasing in stages the contact pressure between second mating surface 22 and seal member 100. As a result, the sealing performance between first member 31 and second member 21 by seal member 100 can be enhanced in accordance with the increase in pressure applied from pressurized-side space 120 to seal member 100.

Although only the contact pressure between second mating surface 22 and first protruding portion 12 has been described, a contact pressure between groove bottom surface 36 and second protruding portion 13 can also be similarly changed.

Examples of types of the seal member include a squeeze packing (such as an O ring or a D ring) that achieves a sealing property by providing a squeeze, and a lip packing (such as a U packing or a V packing) that achieves a sealing property by causing a lip to abut on a sliding surface.

The squeeze packing has advantages that compact arrangement is possible and mounting is easy, whereas the squeeze packing has disadvantages that the friction force is relatively high (particularly in a low pressure region) and stick slip is likely to occur. The lip packing has advantages that the sealing performance is high and the friction force in a low pressure region is low, whereas the lip packing has disadvantages that the lip packing cannot seal a fluid in both directions, and when two seals are combined in order to allow sealing of the fluid in both directions, the structure becomes complicated and compact arrangement becomes difficult. Although there is a packing in which a sliding surface of the lip packing is made of a low-friction material (such as PTFE) having a self-lubricating property, the packing requires surface processing such as material modification, surface treatment or bonding, and thus, the packing becomes expensive.

In contrast, according to the arrangement structure for the seal member in the present embodiment, it is possible to realize a seal member that can make occurrence of stick slip less likely and can be manufactured at low cost, although the seal member is a squeeze packing. It is also possible to realize a packing that can achieve low friction equal to that of a lip packing such as a U packing and can further achieve well-balanced and favorable evaluation in terms of sealability, durability, space-saving property, and cost.

Furthermore, since the arrangement structure for the seal member in the present embodiment is a squeeze packing, the arrangement structure for the seal member in the present embodiment has such a feature that the seal member can be fitted into the groove portion and used, with the seal member being cut at a prescribed part in the circumferential direction. In contrast, a lip packing, a packing subjected to (hard) surface processing on a sliding surface, and a packing made of a plurality of materials are difficult to take such type of usage.

Figure 7:
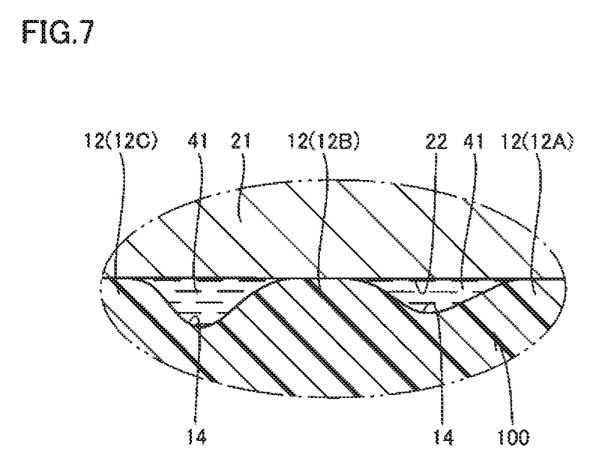
FIG. 7 is an enlarged cross-sectional view of an area surrounded by a two-dot chain line VII in FIG. 4.

FIG. 7 is an enlarged cross-sectional view of an area surrounded by a two-dot chain line VII in FIG. 4. Referring to FIGS. 4 and 7, a recessed portion 14 is provided between first protruding portions 12 adjacent to each other. Oil is stored in recessed portion 14.

In the present embodiment, by reducing the contact pressure (strained force, seal surface pressure) between second mating surface 22 and seal member 100, an optimum oil film can be formed on a contact surface (sliding surface) between second mating surface 22 and first protruding portion 12. At this time, recessed portion 14 can function as an oil reservoir that supplies the oil to the contact surface (sliding surface) between second mating surface 22 and first protruding portion 12.

A basic structure of the arrangement structure for the seal member in the first embodiment of the present invention described above will be summarized. The arrangement structure for the seal member in the present embodiment includes: first member 31 having first mating surface 32 and provided with groove portion 33, groove portion 33 being recessed from first mating surface 32 and extending annularly; second member 21 having second mating surface 22 facing first mating surface 32, and configured to move relatively to first member 31; and annular seal member 100 fitted into groove portion 33, providing sealing between first member 31 and second member 21, and serving as a partition between atmosphere-side space 110 as a first space and pressurized-side space 120 as a second space having a pressure higher than that of atmosphere-side space 110. Seal member 100 includes the plurality of first protruding portions 12 protruding toward second mating surface 22 and aligned from atmosphere-side space 110 toward pressurized-side space 120. Seal member 100 has such a shape that, in a state of not being fitted into groove portion 33, a protrusion height of first protruding portion 12 increases in stages from first protruding portion 12 arranged close to pressurized-side space 120 toward first protruding portion 12 arranged close to atmosphere-side space 110.

According to the arrangement structure for the seal member in the first embodiment of the present invention configured as described above, excellent sliding performance and sealing performance can be obtained between first member 31 and second member 21.

Although the present embodiment has been described in connection with the case in which the present invention is applied to sealing between the reciprocating members, the present invention is not limited thereto. The present invention may, for example, be applied to sealing between rotating members. The present invention is also applicable to a seal structure configured to seal a fluid in both directions. For example, in the present embodiment, a space having oil arranged therein and having a pressure lower than that of pressurized-side space 120 may be provided instead of atmosphere-side space 110.

Second Embodiment

Figure 8:
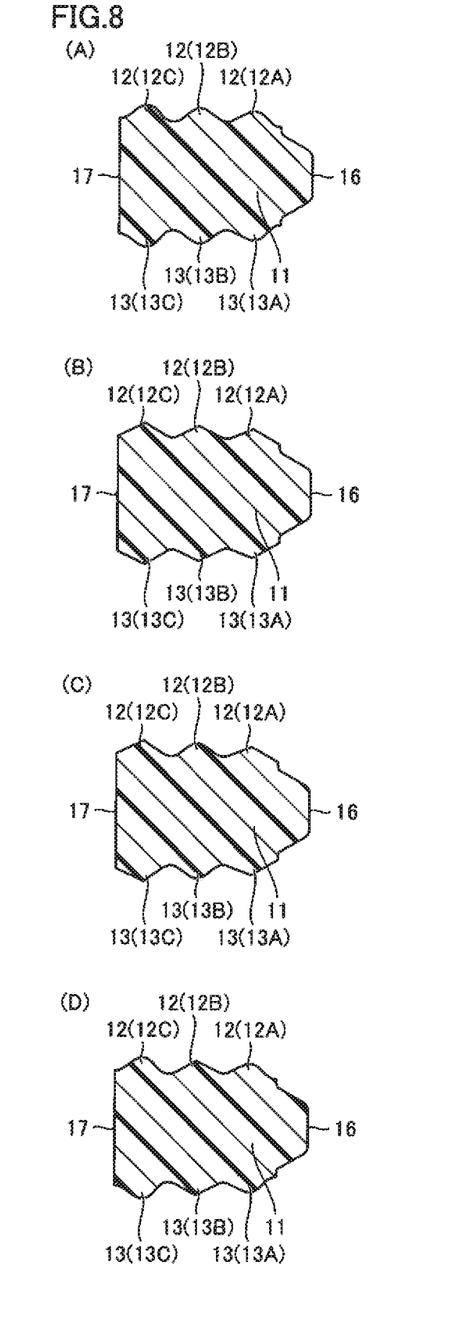
FIG. 8 is a cross-sectional view showing a modification of the seal member.
Figure 9:
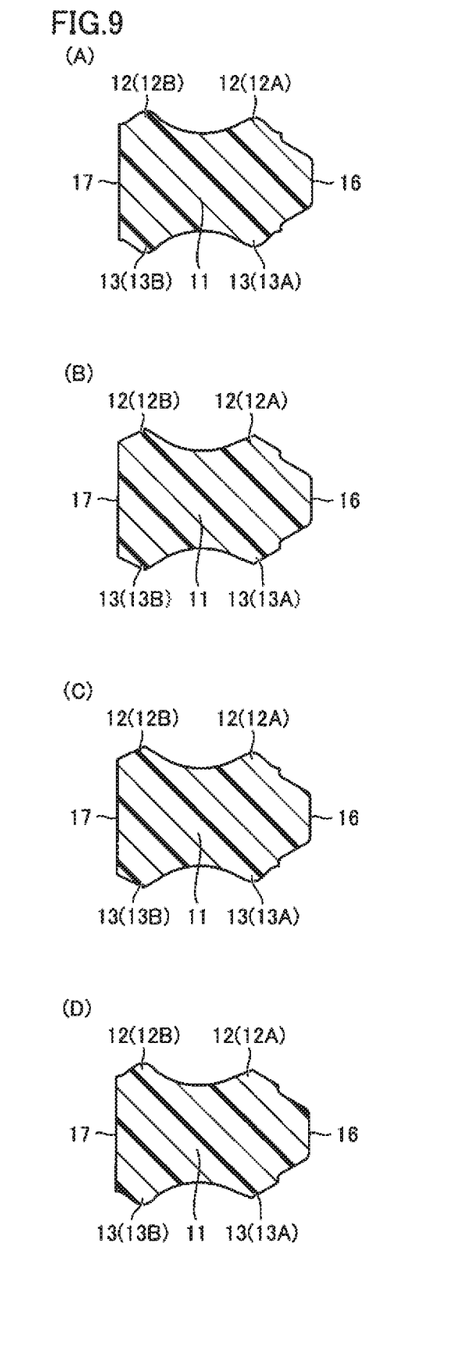
FIG. 9 is a cross-sectional view showing a modification of the seal member.
Figure 10:
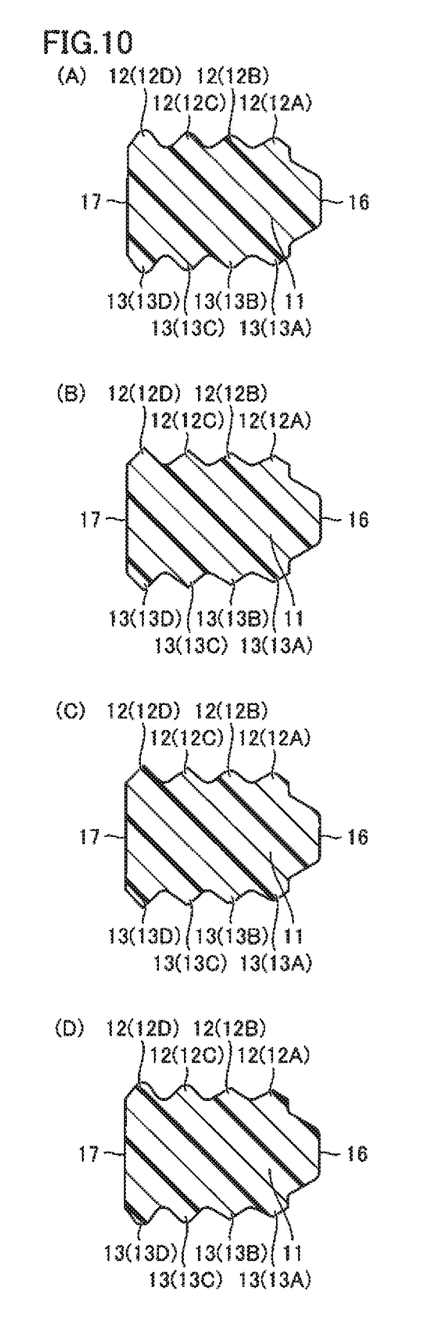
FIG. 10 is a cross-sectional view showing a modification of the seal member.

In the present embodiment, various modifications of seal member 100 in the first embodiment will be described. FIGS. 8 to 10 are cross-sectional views showing various modifications of the seal member. Each of FIGS. 8 to 10 shows a cross-sectional shape of the seal member in a non-fitted state.

As shown in FIGS. 8(A) and 8(B), the seal member may include first protruding portions 12 and second protruding portions 13 having arc-shaped protruding ends from base portion 11, or may include first protruding portions 12 and second protruding portions 13 having edge-shaped protruding ends from base portion 11.

As shown in FIGS. 8(C) and 8(D), the seal member may include both first and second protruding portions 12 and 13 having arc-shaped protruding ends from base portion 11 and first and second protruding portions 12 and 13 having edge-shaped protruding ends from base portion 11. In FIG. 8(C), the protruding ends of first protruding portions 12A and 12C and second protruding portions 13A and 13C have an edge shape, and the protruding ends of first protruding portion 12B and second protruding portion 13B have an arc shape. In FIG. 8(D), the protruding ends of first protruding portions 12A and 12C and second protruding portions 13A and 13C have an arc shape, and the protruding ends of first protruding portion 12B and second protruding portion 13B have an edge shape.

As shown in FIGS. 9 and 10, the number of first protruding portions 12 and second protruding portions 13 of the seal member is not particularly limited. In FIG. 9, the seal member has two first protruding portions 12 and two second protruding portions 13. In FIG. 10, the seal member has four first protruding portions 12 and four second protruding portions 13. The effect of the present invention is more effectively produced when the number of the first protruding portions is three or more.

The arrangement structure for the seal member in the second embodiment of the present invention configured as described above can similarly produce the effect described in the first embodiment.

The configuration of the present invention and the function and effect produced by the present invention will be summarized below.

An arrangement structure for a seal member according to the present invention includes: a first member having a first mating surface and provided with a groove portion, the groove portion being recessed from the first mating surface and extending annularly; a second member having a second mating surface facing the first mating surface, and configured to move relatively to the first member; and an annular seal member fitted into the groove portion, providing sealing between the first member and the second member, and serving as a partition between a first space and a second space having a pressure higher than that of the first space. The seal member includes a plurality of first protruding portions protruding toward the second mating surface and aligned from the first space toward the second spacer. The seal member has such a shape that, in a state of not being fitted into the groove portion, a protrusion height of the first protruding portion increases in stages from the first protruding portion arranged close to the second space toward the first protruding portion arranged close to the first space.

According to the arrangement structure for the seal member configured as described above, the seal member is deformed such that a contact area between the second mating surface and the seal member is small when a pressure applied from the second space to the seal member is low, and the contact area between the second mating surface and the seal member increases in stages as the pressure applied from the second space to the seal member rises. As a result, excellent sliding performance and sealing performance can be obtained between the first member and the second member.

Preferably, the seal member further includes a plurality of second protruding portions protruding toward a bottom surface of the groove portion and aligned from the first space toward the second space. The seal member has such a shape that a protrusion height of the second protruding portion increases in stages from the second protruding portion arranged close to the second space toward the second protruding portion arranged close to the first space.

According to the arrangement structure for the seal member configured as described above, more excellent sliding performance and sealing performance can be obtained between the first member and the second member.

Preferably, the plurality of first protruding portions and the plurality of second protruding portions are provided symmetrically.

According to the arrangement structure for the seal member configured as described above, a contact state between the second mating surface and the seal member as well as a contact state between the bottom surface of the groove portion and the seal member can be obtained in a well-balanced manner.

Preferably, when a pressure applied from the second space to the seal member is low, only the first protruding portion arranged closest to the first space, of the plurality of first protruding portions, comes into contact with the second mating surface.

According to the arrangement structure for the seal member configured as described above, when the pressure applied from the second space to the seal member is low, the contact area between the second mating surface and the seal member is reduced as much as possible, and excellent sliding performance can thereby be obtained.

Preferably, the seal member is deformed such that the first protruding portions come into contact with the second mating surface in order of closeness to the first space, as the pressure applied from the second space to the seal member rises.

According to the arrangement structure for the seal member configured as described above, the contact area between the second mating surface and the seal member is increased in stages as the pressure applied from the second space to the seal member rises, and the sealing performance can thereby be enhanced.

Preferably, oil is arranged in the second space. The seal member further includes a recessed portion provided between the first protruding portions adjacent to each other and configured to store the oil.

According to the arrangement structure for the seal member configured as described above, the recessed portion functions as an oil reservoir, and the sliding performance can thereby be further enhanced.

Preferably, the seal member is made of a single material.

According to the arrangement structure for the seal member configured as described above, the seal member that achieves excellent sliding performance and sealing performance can be manufactured inexpensively.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is applied to an arrangement structure for a seal member for motion, on which a hydraulic pressure, an air pressure or the like acts.

REFERENCE SIGNS LIST 11 base portion; 12, 12A, 12B, 12C first protruding portion; 13, 13A, 13B, 13C second protruding portion; 14 recessed portion; 16 first side surface; 17 second side surface; 21 second member; 22 second mating surface; 31 first member; 32 first mating surface; 33 groove portion; 35 backup ring; 36 groove bottom surface; 37, 37m, 37n groove side surface; 100 seal member; 102 center line; 110 atmosphere-side space; 120 pressurized-side space; 121 initial state; 122 medium pressure state; 123 high pressure state.

The invention claimed is:

1. An arrangement structure for a seal member, comprising:
  a first member having a first mating surface and provided with a groove portion, the groove portion being recessed from the first mating surface and extending annularly;
  a second member having a second mating surface facing the first mating surface, and configured to move relatively to the first member; and
  the seal member fitted into the groove portion, providing sealing between the first member and the second member, and serving as a partition between a first space and a second space having a pressure higher than that of the first space,
  the seal member including a plurality of first protruding portions protruding toward the second mating surface and aligned from the first space toward the second space,
  the seal member having such a shape that, in a state of not being fitted into the groove portion, each of the first protruding portions have a height that increases in stages relative to an adjacent first protruding portion in a direction from a first protruding portion arranged close to the second space toward a first protruding portion arranged close to the first space,
  the seal member further includes a plurality of second protruding portions protruding toward a bottom surface of the groove portion and aligned from the first space toward the second space, and
  the seal member has such a shape that each of the second protruding portions have a height that increases relative to an adjacent second protruding portion arranged close to the second space toward a second protruding portion arranged close to the first space.

2. The arrangement structure for the seal member according to claim 1, wherein
  the plurality of first protruding portions and the plurality of second protruding portions are symmetrical about a center line passing through said seal member.

3. The arrangement structure for the seal member according to claim 1, wherein
  when a pressure applied from the second space to the seal member is low, only the first protruding portion arranged closest to the first space, of the plurality of first protruding portions, comes into contact with the second mating surface.

4. The arrangement structure for the seal member according to claim 3, wherein the seal member is deformed such that the first protruding portions come into contact with the second mating surface in order of closeness to the first space, as the pressure applied from the second space to the seal member rises.

5. The arrangement structure for the seal member according to claim 1, wherein oil is arranged in the second space, and the seal member further includes a recessed portion provided between the first protruding portions adjacent to each other and configured to store the oil.

6. The arrangement structure for the seal member according to claim 1, wherein the seal member is made of a single material.

* * * * *